INVENTOR
DONALD A. MacLEAN
BY Smart & Biggar
ATTORNEYS

United States Patent Office 2,708,853
Patented May 24, 1955

2,708,853

METAL CUTTING TOOL WITH IMPROVED JOINT

Donald A. MacLean, Islington, Ontario, Canada, assignor to The Steel Company of Canada, Limited, Hamilton, Ontario, Canada Application August 31, 1953, Serial No. 377,561

Claims priority, application Canada July 16, 1953

1 Claim. (Cl. 77—71)

This invention relates to metal-cutting tools such as taps, reamers, and drills, and more particularly relates to the provision, in such tool, of an improved joint between the cutting member proper and the shank member which supports the cutting member.

While the invention was developed in connection with the jointing of a tap nib to a shank and is at present expected to find its main application in tapping devices, the invention is, as will be exemplified later on in this specification, also applicable to metal drills and metal reaming tools. I have, however, decided to particularly illustrate, exemplify, and describe the invention as applied to a metal tapping tool.

Tap nibs are conventionally formed from a relatively expensive alloy cutting steel and are rigidly supported by a shank member which need not be formed of the same high quality steel as the tap nib, since it has merely a supporting function, as opposed to a cutting function. According to conventional practice, either (a) the end of the shank which supports the tap nib is flat and the non-operational end of the tap nib is also flat and these two flat surfaces are butt-welded to one another in the manufacture of the tapping tool; or (b) the end of the shank which supports the tap nib is provided with a cylindrical recess, a co-operating cylindrical projection extends integrally and axially from the non-operational end of the tap nib, and a "sweated joint" is made between the projection and the recess in the assembling of the two elements of the tool.

Breakages of tap nibs is a source of concern to engineering works and others who are called upon to conduct any large amount of tapping. The main body of the tap nib breaks or some of the cutting teeth are sheared from the nibs when the nibs are torque-overloaded during a cutting operation. The torque-overloading may, for example, be attributable to an attempt to cut threads in a faulty nut, or it may be attributable to the abuse of the tap nib by attempting to cut threads with it at a time when its teeth require resharpening. I have discovered that the instances of breakage of tap nibs can be appreciably reduced by the provision of a joint between the tap nib itself and the shank which supports it, which joint will break preferentially to the tap nib itself whenever the latter is torque-overloaded during a cutting operation. The physical nature of the joint of my invention will be described in greater detail later on, but I wish to point out before I further define my invention, that, as will readily be appreciated by those familiar with the metal machining art, a joint like mine which breaks preferentially to a metal-cutting tool when that metal-cutting tool has been torque-overloaded would not only be useful in the case of the jointing of tap nibs to a shank, but also in the jointing of a metal-reaming tool to a shank and a metal-drilling bit to a shank.

My invention may be generally defined as the provision, in a metal-cutting tool which includes a metal cutting member and a shank member rigidly supporting the metal-cutting member, of an improved cutting member-to-shank member joint which comprises a frusto-conical stud extending integrally and axially from one of said members, and a co-operating conical recess in the end of the other of said members; said frusto-conical stud and said conical recess having the same apex angle; said stud being metal-bound in said recess; the area of the frusto-conical wall of the stud, that is to say, the stud area available for binding to the co-operating wall of the conical recess, and the composition of the binding material, being so related that the binding metal of the joint will shear preferentially to said metal cutting member itself, should the latter member be torque-overloaded during a cutting operation.

The stud is preferably metal-bound in said recess by soldering, but brazing or any of the many known welding techniques may be employed, so long, of course, as one keeps in mind that the welded or brazed joint must not be so strong that the desideratum of preferential failure at the joint when the tool is overloaded is lost.

I presently prefer to silver-solder the stud in the recess; and the frusto-conical stud preferably extends from the non-operational end of the metal-cutting member; while the preferred apex angle for the stud of the recess lies between about 30° and about 120°. An apex angle of about 60° has been generally found to be the most satisfactory.

In drawings which illustrate embodiments of the invention;

Figure 1:
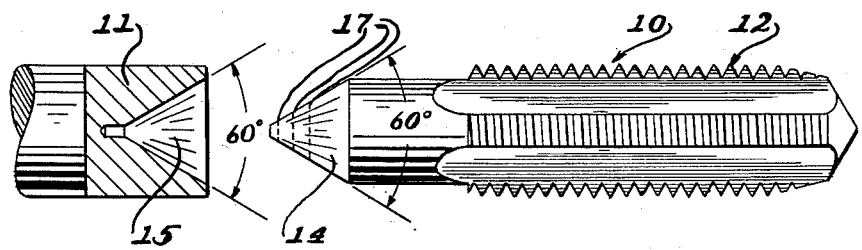
Figure 1 shows the invention applied to the jointing of a tap nib to a shank, with the two parts, i. e., the nib and the shank, separated from one another so as to more clearly illustrate the structure of the two elements in the joint area.

Referring first to Figure 1, reference character 10 generally indicates a tap nib, and reference numeral 11 generally indicates a shank which supports the nib during a metal-cutting operation. Tap nib 10 is provided with the usual thread-cutting teeth 12, and some conventional means (not shown) would, of course, be provided for rotating the shank 11 about its longitudinal axis, or for holding the shank stationary in the case where the cutting nib 10 is to be held in a fixed position during the cutting operation and the work rotated about the longitudinal axis of the tool. Nib 10 must, of course, be rigidly secured to shank 11. It is in the jointing of the nib 10 to the shank 11 that the present invention is applied. The joint will therefore be described in detail.

A frusto-conical stud 14 extends axially and integrally from the non-operational, i. e., non-cutting, end of the tap nib. A co-operating conical recess 15 is provided in the end of the shank 11 which is to support the nib 10. The apex angle of stud 14 has been shown in the drawing as amounting to 60 degrees. It may however be as little as about 30 degrees or as great as about 120 degrees. The apex angle of the conical recess has also been shown in the drawings as amounting to 60 degrees, although it too may range between about 30 and about 120 degrees. However, since the recess 15 is to co-operatively receive the stud 14, it should be noted that the apex angle of the stud and that of the recess should be equal to one another in any given joint. The tap nib 10 is rigidly secured to the shank 11 by soldering, brazing, or welding the frusto-conical wall of the stud to the conical wall of the recess 15. As mentioned earlier, I presently prefer to silver-solder the stud in the recess.

Prior to soldering, brazing, or welding the stud 14 of the nib 10 in the recess 15 of the shank 16, it is necessary to decide at what torque-overloading it is desired to have the joint between 14 and 15 fail, should the tap nib become torque-overloaded in use. Having decided upon that figure, those skilled in the arts of soldering, brazing, and welding, will be readily able to determine what solder, brazing metal, welding rod etc. should be employed, and what the area of the frusto-conical wall of the stud, that is to say the stud area available for metal-binding to the co-operating wall of the recess 15, should be. If, for example, it is found that with a particular solder selected for usage, and with a stud and recess as indicated at 14 and 15 respectively in Figure 1, the conical wall area of the stud would be too great, i. e., would result in too strong a union between the nib 10 and the shank 11, the conical wall area available for soldering could be reduced by transversely cutting the stud along one of the dotted lines shown at 17 in Figure 1.

While the applicant would like, in his specification, to be able to provide some general rules of universal application which would give definite instructions to those who wish to practice this invention as to exactly what the conical wall area of the stud 14 should be and what solder, brazing metal, etc. should be selected, he finds it impossible to do this since the variables that must be considered are far too numerous. As already pointed out, the invention may be applied to drilling and reaming tools as well as tapping tools. The various uses to which such tools may be put are numerous and, on top of this, there is, of course, variation in diameter of both the shank and metal-cutting tool, as well as variation in the metals or alloys which make up the shanks and the metal-cutting tools. Under the circumstances, the applicant has had to content himself with listing the structural and physical features of interest in the case of one metal-cutting tool according to his invention. The metal-cutting tool in question, namely, a nut-tapping tool of the type shown in Figure 1 of the drawings had the following structural and physical characteristics:

1. Diameter of tap nib 10 in region adjacent stud 14: .392 inch (for ½ inch tap).
2. Nature of metal employed as tap nib 10: A high speed steel containing 1.25 to 1.30% C; .25 to .35% Si; .20 to .30% Mn; not more than .030% S; not more than .030% P; 5.25 to 5.75% Wo; 4.25 to 4.75% Cr; 3.75 to 4.25% Va; and 4.25 to 4.75% Mo.
3. Diameter of shank 11 in region adjacent recess 15: .375 inch.
4. Nature of metal employed as shank 11: A carbon steel containing 1.15 to 1.25% C; .20 to .30% Mn; and .20 to .30% Si.
5. The solder used was a silver solder having the following composition: 50% silver, 15.5% copper, 16.5% zinc, 18% cadmium, melting point 1160° F., flow point 1175° F., which composition is known to the trade as "Grade 12 Silver Solder."
6. Apex angle of recess and stud: 60 degrees.
7. Axial length of stud: .135 inch.
8. Conical wall area of stud 14 available for soldering, as calculated from information listed under points 1, 6 and 7 above: .142 sq. inch.
9. Approximate torque loading which causes breakage of soldered joint: 425 to 475 inch-pounds.
10. Approximate torque loading which, in the absence of the joint of the invention, would be apt to cause breakage of a tap nib having the characteristics mentioned under 1 and 2 above: 500 inch-pounds.

Since the nature of the invention, and the way in which the invention may be put into operation has, it is believed, already been amply illustrated in the case of Figure 1, brief reference only will be made to Figures 2 and 3.

Figure 2:
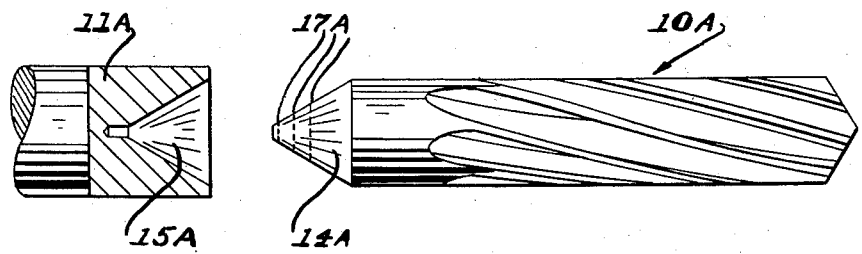
Figure 2 is generally similar to Figure 1, but shows the application of the invention to a metal-reaming tool.

In Figure 2, 10A is a metal-reaming member, and 11A is a shank intended to support this member. The joint employed in Figure 2 is similar to the joint employed in Figure 1, and therefore the parts have been labelled as in Figure 1, but with the addition of reference character A to each numeral.

Figure 3:
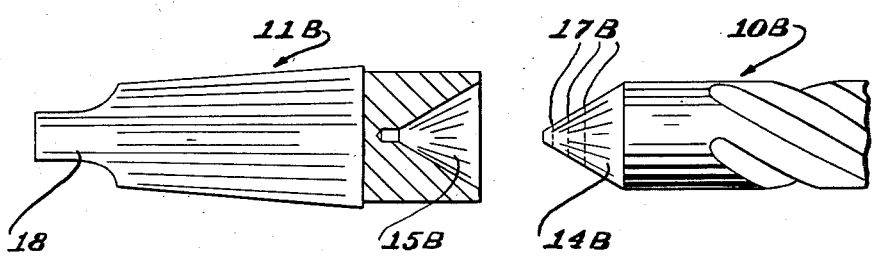
Figure 3 is also generally similar to Figure 1, but shows the invention applied to the jointing of a metal-cutting twist drill to a conventional Morse-tapered drill shank provided with a tang.

Figure 3 shows the invention applied to a metal-cutting drill in which 10B is a twist drill bit, and 11B is a Morse-tapered drill shank intended to support the bit 10B. Drill shank 11B has a conventional tang 18. The joint employed in Figure 3 is similar to the joint employed in Figure 1, and therefore the parts have been labelled as in Figure 1, but with the addition of reference character B to each numeral.

The applicant is employed in a large Canadian steel-producing and fabricating plant where threaded nuts are produced in large quantities, so that a large number of tapping nibs are used in the plant. The nature of the applicant's employment enabled him to adequately test the value of his contribution to the art. It was found, as a result of the compilation and comparison of data taken over a period of several months both before and after the adoption of his invention, that tap nib consumption was reduced by over 50% through adoption of the invention.

What I claim as my invention is:

In a metal cutting tool including a metal-cutting member and a shank member rigidly supporting said metal-cutting member, the improved cutting member-to-shank member joint which comprises, a smooth surfaced frusto-conical stud extending integrally and axially from one of said members, a cooperating smooth surfaced conical recess in the end of the other of said members, said frusto-conical stud and said conical recess having the same apex angle, and bonding metal means cooperating with the recess and the area of said frusto-conical surface available for binding to the recess surface to provide a joint which will shear relative to said metal-cutting member itself when the latter member is torque-overloaded during a cutting operation.

References Cited in the file of this patent
UNITED STATES PATENTS

| | | |
|---|---|---|
| 288,676 | Stearns | Nov. 20, 1883 |
| 1,191,717 | Moore | July 18, 1916 |
| 2,334,755 | Eglinton | Nov. 23, 1943 |
| 2,512,033 | Metz | June 20, 1950 |